Nov. 7, 1944.                A. B. GARDELLA                2,362,368
                            FLAGSTAFF STRUCTURE
                           Filed Dec. 18, 1941              2 Sheets-Sheet 1

INVENTOR
ALBERT B. GARDELLA
BY
Hyde and Meyer
ATTORNEYS

Nov. 7, 1944. A. B. GARDELLA 2,362,368
FLAGSTAFF STRUCTURE
Filed Dec. 18, 1941 2 Sheets-Sheet 2

INVENTOR
ALBERT B. GARDELLA
BY
Hyde and Meyer
ATTORNEYS

Patented Nov. 7, 1944

2,362,368

UNITED STATES PATENT OFFICE 2,362,368

FLAGSTAFF STRUCTURE

Albert B. Gardella, Cleveland, Ohio

Application December 18, 1941, Serial No. 423,464

3 Claims. (Cl. 248—226)

This invention relates to flag staff structures and more particularly, to flag staff structures of the type having clamping means at their lower ends to enable them to be detachably connected to the bumpers of automobiles and the like with the flag staffs in substantially upright positions.

The present invention has for its general object the provision of a flag staff structure of the aforesaid type which is of simple and inexpensive form, of strong and sturdy character, and which may be easily, quickly and conveniently attached to and detached from an automobile bumper or the like.

A more specific object of the present invention is the provision of a flag staff structure of the aforesaid type which has improved clamping means for enabling it to be detachably connected to an automobile bumper, said clamping means being of such character that it is adapted for use with the bumpers of all automobiles, including the front bumpers of those automobiles which are provided with sheet metal shields or aprons closely adjacent such bumpers.

A still more specific object of the present invention is the provision of a flag staff structure of the aforesaid type in which the clamping means thereof comprises two oppositely extending upper clamping jaws and a lower clamping jaw adapted to be swung to cooperative position beneath either of the two upper clamping jaws, depending upon the body and/or bumper construction of the automobile with which the flag staff structure is to be used.

Further objects of the present invention are in part obvious and in part will appear from the following description of an embodiment thereof, reference being had to the accompanying drawings, in which.

Figure 3:
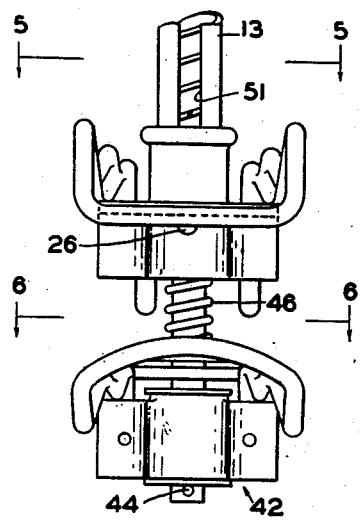
Fig. 3 is a rear view, on an enlarged scale, of said lower end portion of said flag staff structure, the clamping jaws thereof being in the relationship shown in Fig. 1.
Figure 5:
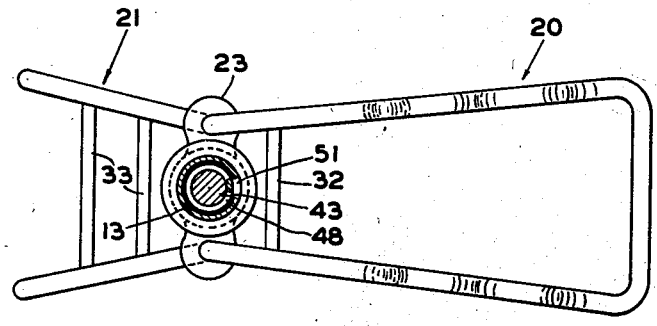
Figure 6:
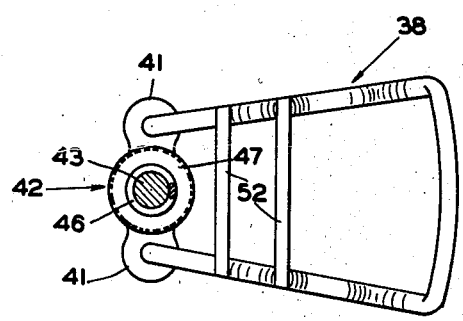
Figure 7:
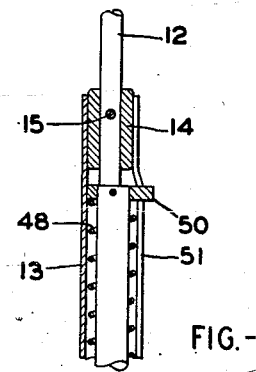
Figure 8:
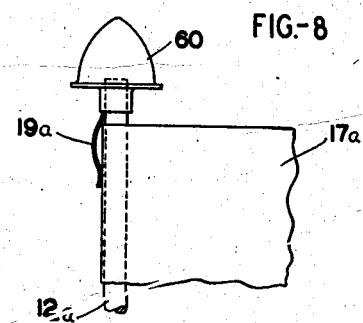

Figs. 5 and 6 are detail cross-sectional views of said lower end portion of said flag staff structure, the views being on the lines 5—5 and 6—6, Fig. 3, respectively;

Fig. 7 is a detail vertical sectional view of an intermediate portion of said flag staff structure; and Fig. 8 is a side elevation of the somewhat modified upper end portion of a flag staff structure.

Before the present invention is described in detail, it is to be understood that such invention is not limited to the details of construction and/or the specific arrangement of parts herein illustrated or described, as the invention obviously may take other forms. It also is to be understood that the phraseology or terminology herein employed is for the purpose of description and not of limitation, the scope of the present invention being indicated by the appended claims.

Figure 1:
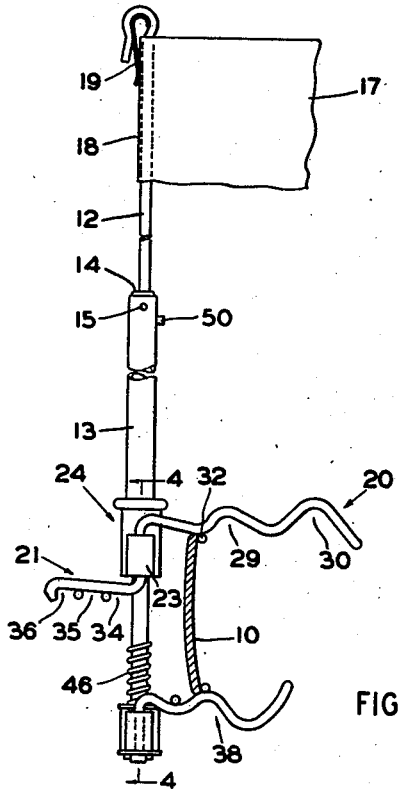
Fig. 1 is a side elevation of a flag staff structure embodying one form of the present invention, the flag staff structure being detachably connected to the front bumper of an automobile, with the flag staff in upright position.
Figure 2:
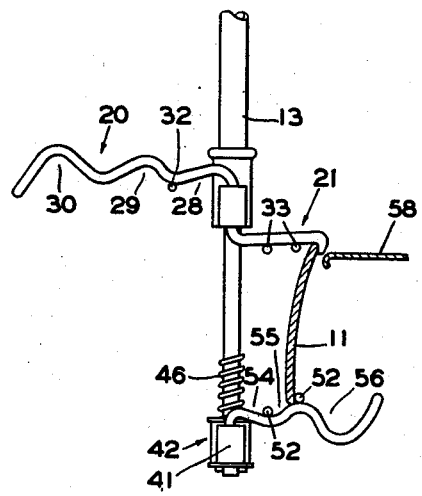
Fig. 2 is a side elevation of the lower end portion of said flag staff structure as detachably connected to the front bumper of an automobile having a shield or apron adjacent said bumper.

Referring first to Figs. 1 to 7 inclusive, it will be noted that the flag staff structure there illustrated comprises a flag staff and clamping means at the base of said staff for detachably connecting said staff in generally up-right position to an automobile bumper, such as a front automobile bumper 10, Fig. 1, or a front automobile bumper 11, Fig. 2.

The flag staff here shown comprises an upper section in the form of a metal rod 12 and a lower section in the form of a metal tube 13, the diameter of said tube being somewhat larger than that of said rod. For the connection of the adjacent ends of said sections, the lower end of the rod 12 is here provided with a bushing 14 of such size as to fit within the upper end of the tube 13, and extending transversely through said rod, bushing and tube is a rivet 15 or the like.

The reference numeral 17 in Fig. 1 designates a flag, banner or the like, such as a fabric funeral flag, the hemmed edge 18 of said flag being adapted to be sleeved over the upper end portion of the rod 12 in a manner which will be readily understood. To releasably maintain said flag in proper position on said rod, a spring clamping finger 19 is suitably mounted on the upper end portion of said rod, and by slipping the upper end portion of the hemmed edge of the flag beneath said spring finger, said flag is releasably but firmly retained in place on said rod. As here shown, the upper end of the rod 12 is finished off by making it of gooseneck form, the upper end portion of the spring finger 19 being shaped to conform to the interior of said gooseneck and being welded or otherwise suitably attached thereto.

The bumper clamping means at the base of the flag staff just described comprises two oppositely extending upper clamping jaws and a single lower clamping jaw, said lower clamping jaw being adapted to be swung beneath either of the two upper clamping jaws for clamping cooperation therewith, as will hereinafter more fully appear. As here shown, the two upper clamping jaws are formed from a single piece of wire, the middle portion of said wire being bent into a U-shaped loop to form the jaw 20 and the two end portions of said wire forming the oppositely extending jaw 21. The two intermediate portions 22 of said wire (see Fig. 4), between the jaws 20 and 21 thereof, extend through and are anchored in the perforated ears 23 of a mounting member 24, the central portion 25 thereof being recessed or socketed to receive the lower end of the flag staff tube 13. For the connection of said mounting member 24 to the lower end of tube 13, a rivet 27 is here utilized (see Fig. 4), said rivet extending through the front wall of said tube and the front wall of the central portion of member 24, the rear wall of such central portion being provided with a suitable aperture 26 (Fig. 3) for the insertion of said rivet.

As best shown in Figs. 1 and 2, the wire side portions of the upper jaw 20 are here corrugated to provide a series of bumper-receiving recesses, there being three such recesses, designated by the reference numerals 28, 29 and 30, in the embodiment of the invention here being described. If desired and as here shown, the two wire side portions of the jaw 20 may be connected from beneath and adjacent their inner ends by a cross wire 32 welded or otherwise suitably secured thereto, the result being to provide a more rigid and durable jaw, as well be readily understood.

The two wire end portions which form the oppositely extending upper clamping jaw 21, although here free of corrugations, are connected from beneath by a pair of laterally spaced cross wires 33 welded or otherwise suitably secured thereto, said cross wires, together with the down turned outer ends of said wire end portions, providing this jaw 21 with a series of bumper-receiving recesses, the three recesses thus formed being designated by the reference numerals 34, 35 and 36.

Figure 4:
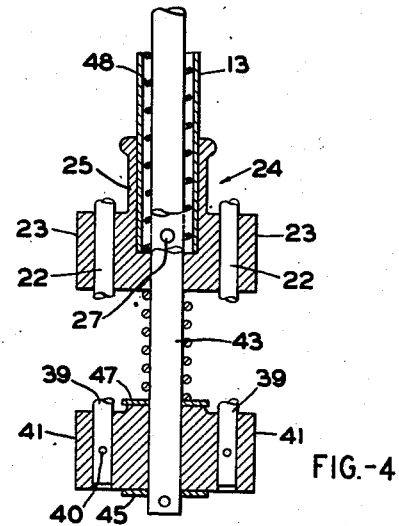
Fig. 4 is a detail vertical sectional view of said lower end portion of said flag staff structure, the view being on the line 4—4, Fig. 1.

The single lower clamping jaw 38, which may be swung beneath either of the two upper clamping jaws for clamping cooperation therewith, is also formed from a single piece of wire, said jaw being in the form of a substantially U-shaped loop. As best shown in Fig. 4, the depending end portions 39 of said wire are pinned, as at 40, or otherwise suitably anchored in the perforated ears 41 of a mounting member 42 located on the lower end of a metal rod 43 extending upwardly through the mounting member 24 for the upper clamping jaws and into the metal tube 13 which constitutes the lower section of the flag staff.

The mounting member 42 for the lower clamping jaw is rotatably mounted on the lower end of the rod 43 and is here held against escape from said rod by a cotter pin 44 which extends through said rod below said mounting member, a washer 45 being interposed, if desired and as here shown, between said member and said cotter pin. To yieldingly resist turning movement of the mounting member 42 relative to the rod 43 by which it is carried, when the flag staff structure is not in use, a coiled compression spring 46 is here interposed between the two mounting members 24 and 42 for the upper and lower clamping jaws, said spring surrounding the rod 43, as shown. When the flag staff structure is not in use, as in Fig. 3, the upper end of said spring abuts the bottom surface of the upper mounting member 24, the lower end of said spring abutting either the top surface of the lower mounting member 42 or, as here shown, a washer 47 which rests upon said top surface of the mounting member 42.

In order to yieldingly resist divergent movement of the upper and lower clamping jaws, and thus enable said jaws to firmly grip or to be clamped upon an automobile bumper or the like, a relatively long and relatively stiff compression spring 48 is located within the flag staff tube 13, around the rod 43 therein. As best shown in Figs. 4 and 7, the lower end of said spring abuts the base of the tube-receiving recess or socket of the upper mounting member 24 and the upper end of said spring abuts the headed upper end of the rod 43. In order to prevent turning movement of the rod 43 within the flag staff tube 13 and the mounting member 24 carried thereby, the headed upper end of said rod is here provided with a lateral projection 50 which extends through a longitudinally disposed slot 51 in said tube, said slot being provided, for example, by the use of a tube of longitudinally split form.

Like those of the upper clamping jaw 20, the wire side portions of the lower clamping jaw 38 are of corrugated form, and are here shown as being connected from above by a pair of laterally spaced cross wires 52 welded or otherwise suitably secured thereto. As a result, said lower clamping jaw also is provided with a series of three bumper-receiving recesses, which are here designated by the reference numerals 54, 55 and 56.

The provision of a pair of oppositely extending upper clamping jaws and a single lower clamping jaw for clamping cooperation with either of said upper jaws, and more particularly, the provision of upper and lower clamping jaws of the character here disclosed, enables the present flag staff structure to be easily, quickly and conveniently clamped to the front bumper of any automobile, including the front bumpers of those automobiles which are provided with sheet metal shields or aprons closely adjacent such bumpers.

In Fig. 1, the flag staff structure is detachably connected to a front automobile bumper 10 by the use of the upper clamping member 20 and the lower clamping member 38, the upper edge of said bumper lying in the recess 28 of the upper clamping jaw, against the cross wire 32 thereof, and the lower edge of said bumper lying in the middle recess 55 of the lower clamping jaw, against the outer one of the two cross wires 52 thereof. The upper clamping jaw 21, now idle, extends forwardly, as shown in Fig. 1.

In Fig. 2, the flag staff structure is detachably connected to the front bumper 11 of an automobile provided adjacent said bumper with a shield or apron 58, and for the connection of said flag staff structure to such a bumper, the shorter of the two upper clamping jaws, namely, jaw 21, is used in conjunction with the lower clamping jaw. As shown, the upper edge of the bumper 11 lies in the outer recess 36 of the upper clamping jaw, against the hook-shaped outer end thereof, the lower edge of said bumper lying in the middle recess of the lower clamping jaw, against the outer cross wire 52, as in Fig. 1.

Thus, by using one or the other of the upper clamping jaws with the lower clamping jaw, and by using the proper recesses of the two jaws thus selected, the present flag staff structure may be firmly though detachably clamped to the front bumper of any automobile, with the flag staff in an upright position, all as will be readily understood.

With reference to Fig. 8, it will be noted that the spring finger 19a, for releasably holding in place the flag or banner 17a, is secured to the upper end of the flag staff rod 12a by a finishing knob 60, here telescopically mounted upon said rod and frictionally or otherwise removably retained thereon.

Further features and advantages of the present invention will be readily apparent to those skilled in the art to which it relates.

What I claim is:

1. Clamping means for a flag staff structure or the like, comprising a tubular member for the support of the flag staff structure or the like, an upper carrier element having a socket in which the lower end of said tubular member is rigidly mounted, two upper oppositely extending clamping jaws rigidly carried by said upper carrier element at different levels, a rod-like member slidably mounted in said tubular member and having a portion projecting therebelow, a coiled compression spring located within said tubular member, the upper end of said spring engaging a fixed abutment of said rod-like member and the lower end of said spring being seated in the socket of said upper carrier element, a lower carrier element rotatably mounted on the projecting portion of said rod-like member, a lower clamping jaw rigidly carried by said lower carrier element, the rotatable mounting of said lower carrier element enabling the lower clamping jaw carried thereby to be located beneath either of said upper clamping jaws for clamping cooperation therewith, the compression of said spring when said lower clamping jaw is moved below a predetermined level with respect to the upper clamping jaw in alignment therewith enabling the two aligned jaws to be firmly and releasably clamped to an automobile bumper or other object.

2. Clamping means for a flag staff structure or the like, comprising a tubular member for the support of the flag staff structure or the like, an upper carrier element rigidly secured to said tubular member, two differing and oppositely extending upper clamping jaws rigidly carried by said upper carrier element, a rod-like member slidably mounted in said tubular member and having a portion projecting therebelow, a coiled compression spring arranged within said tubular member, the upper end of said spring engaging a fixed abutment of said rod-like member and the lower end of said spring engaging an abutment fixed with respect to said tubular member, a lower carrier element rotatably mounted on the projecting portion of said rod-like member, a lower clamping jaw rigidly carried by said lower carrier element, the rotatable mounting of said lower carrier element enabling the lower clamping jaw carried thereby to be located beneath either of said upper clamping jaws for clamping cooperation therewith, said compression spring being under compression only when said lower clamping jaw is below a predetermined level with respect to the upper clamping jaw in alignment therewith, and a coiled compression spring carried by the projecting portion of said rod-like member between said upper and lower carrier elements, said last mentioned compression spring being engaged and being put under compression by said upper and lower carrier elements when said lower clamping jaw is at or above the aforesaid predetermined level, whereby rotary movement of said lower carrier element and the lower clamping jaw carried thereby relative to the rod-like member is yieldingly resistant by said second mentioned compression spring when the present clamping means is not in use.

3. Clamping means for a flag staff structure or the like, comprising a tubular member for the support of the flag staff structure or the like, an upper carrier element having a socket within which is rigidly secured the lower end of said tubular member and also having oppositely disposed laterally extending ears, two upper clamping jaws each rigidly carried by the ears of said upper carrier element, one jaw extending forwardly and the other rearwardly and said jaws being disposed at differing levels and being of differing lengths, a rod-like member slidably mounted in said tubular member and having a portion projecting therebelow, a lower carrier element rotatably mounted on the projecting portion of said rod-like member and having oppositely disposed laterally extending ears, a lower clamping jaw rigidly carried by the ears of said lower carrier element, the rotatable mounting of said lower carrier element enabling the lower clamping jaw carried thereby to be located beneath either of said upper clamping jaws for clamping cooperation therewith, and spring means for yieldingly resisting movement of said lower clamping jaw below a predetermined level with respect to the upper clamping jaw in alignment therewith, whereby said two aligned clamping jaws may be releasably clamped to an automobile bumper or other object.

ALBERT B. GARDELLA.